(12) United States Patent
Frus et al.

(10) Patent No.: US 6,771,519 B2
(45) Date of Patent: Aug. 3, 2004

(54) METHOD AND APPARATUS FOR GENERATING HIGH VOLTAGE

(75) Inventors: John R. Frus, Jacksonville, FL (US); Michael J. Cochran, Jacksonville, FL (US)

(73) Assignee: Unison Industries, Inc., Jacksonville, FL (US)

( * ) Notice: Subject to any disclaimer, the term of this patent is extended or adjusted under 35 U.S.C. 154(b) by 125 days.

(21) Appl. No.: 10/247,938

(22) Filed: Sep. 20, 2002

(65) Prior Publication Data

US 2003/0021132 A1 Jan. 30, 2003

Related U.S. Application Data

(62) Division of application No. 09/677,079, filed on Sep. 29, 2000.

(51) Int. Cl.[7] .............................. H02M 3/335; F02P 1/08
(52) U.S. Cl. ........................ 363/21.12; 363/69; 363/71; 123/406.57; 123/651
(58) Field of Search .......................... 363/16, 20, 21.01, 363/21.12, 21.13, 21.15, 21.16, 21.17, 21.18, 65, 69, 71; 123/406.57, 651, 652

(56) References Cited

U.S. PATENT DOCUMENTS

| | | |
|---|---|---|
| 3,569,727 A | 3/1971 | Aggarwal |
| 3,788,293 A | 1/1974 | Anderson |
| 3,835,830 A | 9/1974 | Shepherd |
| 4,223,656 A | 9/1980 | Hamley |
| 4,375,794 A * | 3/1983 | Wasmer .................. 123/406.57 |
| 4,814,965 A | 3/1989 | Peterson |
| 4,983,886 A | 1/1991 | Balland |
| 5,347,422 A | 9/1994 | Smith et al. |
| 5,485,361 A * | 1/1996 | Sokal ...................... 363/21.17 |
| 5,682,303 A | 10/1997 | Goad |
| 5,796,595 A | 8/1998 | Cross |
| 6,031,747 A | 2/2000 | Ilic et al. |

* cited by examiner

*Primary Examiner*—Jessica Han
(74) *Attorney, Agent, or Firm*—Leydig, Voit & Mayer Ltd.

(57) ABSTRACT

A power supply is described that comprises two or more flyback-type, DC-to-DC converters having substantially the same periods for their respective charge-discharge cycles; inputs from a common power source; outputs that are connected to a common output node and circuitry for controlling the charge-discharge cycles of the two or more converters so that the cycles of one converter is out of phase with respect to the charge-discharge cycles of at least one of the other converters.

9 Claims, 4 Drawing Sheets

FIGURE 1  Interleaved Flyback Converter

FIGURE 2   Dual Interleaved Timing Diagram

FIGURE 3  Triple Interleaved Timing Diagram

METHOD AND APPARATUS FOR GENERATING HIGH VOLTAGE

This patent application is a divisional of copending U.S. patent application Ser. No. 09/677,079 filed on Sep. 29, 2000 to John Frus and Michael Cochran entitled "Method and Apparatus for Generating High Voltage."

CROSS-REFERENCE TO RELATED PATENT APPLICATION

This patent application is related to copending U.S. patent application Ser. No. 09/676,220 to John Frus and Michael Cochran, entitled Method And Apparatus For Generating A Sustained Arc At A Sparking Device, filed Sep. 29, 2000, which is hereby incorporated by reference in its entirety.

FIELD OF THEN INVENTION

This invention relates generally to improving the performance of high-voltage flyback-converters, and more specifically to a circuit configuration that offers higher output power while maintaining high-efficiency and high-reliability. This invention improves the performance of capacitive-discharge ignition systems, and is broadly applicable to other systems where an energy storage capacitor must be charged to a high voltage, such as the system used to provide the power in pulsed-plasma thrusters for spacecraft propulsion.

BACKGROUND OF THE INVENTION

Flyback-type DC-to-DC converters are well known in the art. They operate by allowing a current to increase in the primary of a transformer, and then abruptly terminating that current. The magnetic energy stored in the transformer at that instant is transferred to a secondary winding, producing a current and voltage that drives a load. This second step in the process is called the flyback cycle. An important property of flyback converters is that their output power is provided as a series of pulses, and the output during each pulse behaves as a current source and delivers a fixed quantity of energy. Flyback converters are very good at charging capacitors to store energy. First, they are able to deliver their output current pulses into a short circuit, which is similar to the load initially presented by an uncharged capacitor. Second, as the capacitor charges, they are capable of delivering a very high voltage, since their output voltage is not restricted by the turns-ratio of the transformer, as is the case for forward converters.

Pulsed-plasma thrusters used on spacecraft for positioning require periodic charging of an energy storage capacitor that supplies voltage to a pair of electrodes that are part of the thruster. Between these electrodes is a material such as Teflon that can be ablated (vaporized) by an electric arc across its surface. No arc occurs because the vacuum of space prevents arc formation. The arc is initiated by creating a small spark from a discharge initiation device, which is similar to a small sparkplug. Ions from the small spark bridge the gap between the main electrodes allowing large plasma to form along their trail. The energy storage capacitor discharges instantly, which creates a large current on the order of tens of thousands of Amperes. In order to propel the spacecraft, many pulses must occur repetitively since each pulse represents a very small thrust. Converters for such a system must have sufficient power to charge the capacitor quickly to a high voltage, and at a high repetition rate. An example would be a converter that stores 50 Joules of energy in the capacitor three times per second; this converter needs a throughput of 50J×3/sec=150 Watts. Also important is that it must be extremely reliable, small in volume, and lightweight. A converter made according to this invention offers these advantages.

Capacitor Discharge ignition systems (CD ignition) is common in reciprocating engines, turbine engines, and stationary ignition applications such as burners. In a CD ignition, a converter must charge an energy storage capacitor that is discharged by a switch or semiconductor-device to create a spark to ignite a fuel mixture. In turbine engines, spark rates are generally low but energy per spark can be very high (tens of Joules at ones of sparks/second). In a reciprocating (piston) engine, much lower energy may work, but a high spark rate is required in multiple cylinders (tens of millijoules at hundreds of sparks/second). The latter application particularly benefits from a converter built according to this invention because of its ability to deliver the higher wattage required when the engine is run at high RPM.

In these demanding applications there are several characteristics that limit performance of flyback converters. First, they are power-limited. These converters are prevalent in low power applications, typically tens of Watts. They are not as good for higher power because their input current generally increases to allow more energy storage during each charge cycle. This leads to higher $I^2R$ losses (current squared×resistance) in the transformer windings and efficiency suffers. Second, the operating frequency may become a limiting factor due to the time it takes to charge the primary or discharge the secondary at higher power levels. At this limited frequency, output ripple (peaks and valleys in the output voltage) is severe. Fundamentally, flyback converters have an output that resembles half-wave AC rectification. Power delivery only occurs during one half-cycle, and is zero during the intervening half-cycles. Large input and output filter components must be used to smooth both the power input and the power delivery, which adversely affect system weight and size, reducing their desirability for use on spacecraft or other airborne applications.

SUMMARY OF THE INVENTION

In order to overcome these limitations, it is an object of this invention to deliver higher output-power without incurring high electrical losses or weight penalties by providing interleaved operation of two or more related flyback circuits that share a common load.

It is a related object of the invention to more quickly charge a load capacitor to a high voltage. It is another related object of the invention to allow higher rates of periodic discharge of the load for pulsed applications in spacecraft thrusters or ignition applications.

It is another object of the invention to deliver steady low-ripple output power without requiring larger output filter components.

It is a further object of the invention to provide at least partial redundancy so that failure of certain key power electronic components will only reduce, but not eliminate power output.

It is a further object of the invention to provide improved control of charging and regulation of load voltage and load current.

It is a further object of the invention to reduce the input current ripple in high power applications thus reducing the size of input filter components. It is a related object of the invention to reduce electromagnetic interference emanating from either input or output connections.

BRIEF DESCRIPTION OF THE DRAWINGS

These and other features and advantages of the invention will be more readily apparent upon reading the following description of the preferred embodiment of the invention and upon reference to the accompanying drawings wherein.

DETAILED DESCRIPTION OF THE INVENTION

Figure 1:
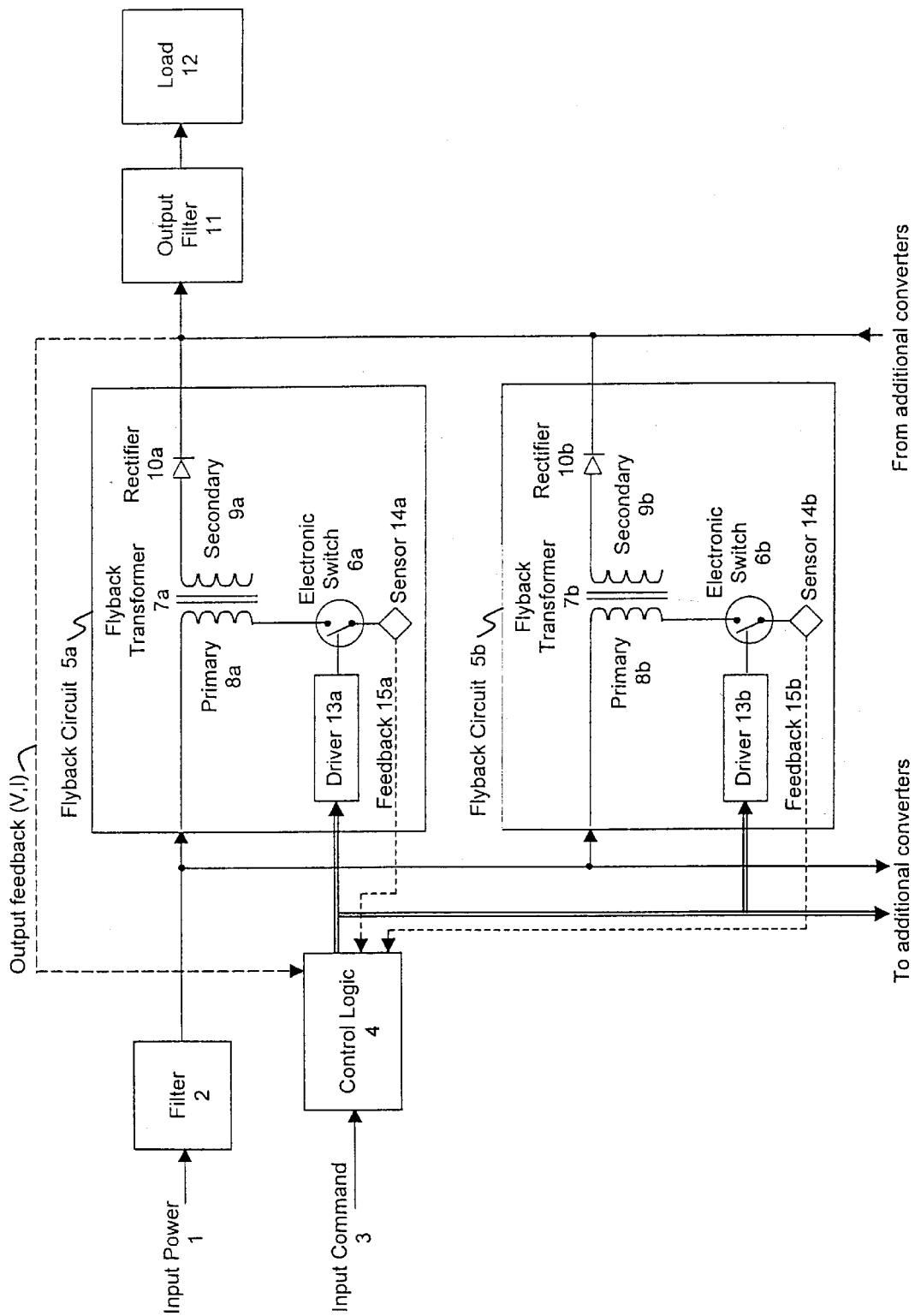
FIG. 1 is a block diagram illustrating the architecture of a system in accordance with the instant invention.

FIG. 1 shows the block diagram of a power supply constructed in accordance with the teachings of the instant invention. Many of the functional blocks are well understood and could be implemented in a variety of functionally equivalent ways. This description will not dwell on the operation of these blocks; it will concentrate on their inter-related operation that is necessary to achieve the instant invention.

Although two common applications (spacecraft thrusters and ignition circuits) have been described which realize the benefits of the invention, it will become apparent to one skilled in the art that the invention is applicable to other applications which require controlled and efficient delivery of high-voltage power.

Referring to FIG. 1, two parallel circuits are shown, and the following description is written to describe operation of these two circuits in a dual-interleaved manner. It will become apparent to one skilled in the art that triple interleaving is possible within the scope of the invention, and that even more stages can be added and interleaved. This is somewhat analogous to three-phase AC versus single-phase AC power systems.

In FIG. 1, a control circuit 4 receives a command 3 to begin delivering output power. This control circuit activates one of the multiple flyback circuits 5a, 5b, etc. which draw input power from a common power source 1 through an input filter 2. The activation is accomplished by turning on an electronic switch 6 that controls current flow through the primary winding 8 of flyback-transformer 7. After sufficient energy has been stored in the primary winding of the selected circuit, its charging is abruptly interrupted by turning off switch 6. This ends the "charging cycle". The energy stored in the transformer is instantly transferred to its secondary winding 9, and exits via rectifier diode 10 toward the load 12 via output filter 11. This begins the "flyback cycle" which continues until substantially all of the energy stored in the transformer is transferred to the load 12.

A driver circuit (13a, 13b) provides sufficient control energy to the semiconductor switch to insure that it turns on or off quickly. Many commercial integrated circuit driver chips exist which provide this function. After the switch is turned on, the current increases in the primary circuit 7a and stores energy in the transformer's magnetic circuit. A sensor (14a, 14b) which is often a current transformer monitors energy storage in the primary of transformers 7a, 7b. A feedback signal (15a, 15b) from this sensor causes the control logic 4 to terminate the charge cycle when the appropriate energy has been stored. The control logic turns off the switch 6a and thus initiates the flyback cycle, and then starts the charge cycle of the other flyback circuit 5b. Control logic 4 sets the timing of the multiple converters to keep them synchronized in an interleaved manner. Control logic 4 also receives feedback from the output that indicates the voltage and/or current at the load. This feedback is monitored by the control logic 4 to terminate charging of a load capacitor when it reaches the desired charge, or to regulate the converters to maintain the output voltage and current at specific levels.

At the beginning of the flyback cycle of the selected circuit, the control circuit 4 diverts input power to a second flyback circuit (e.g. 5b) so that its "charging cycle" occurs while the other converter is completing its "flyback cycle. The duty cycle is controlled at 50% in this dual-interleaved system so that the flyback cycle of the second converter will exactly overlap the charging cycle of the first converter, while the flyback cycle of the first converter overlaps the charging cycle of the second.

Figure 2:
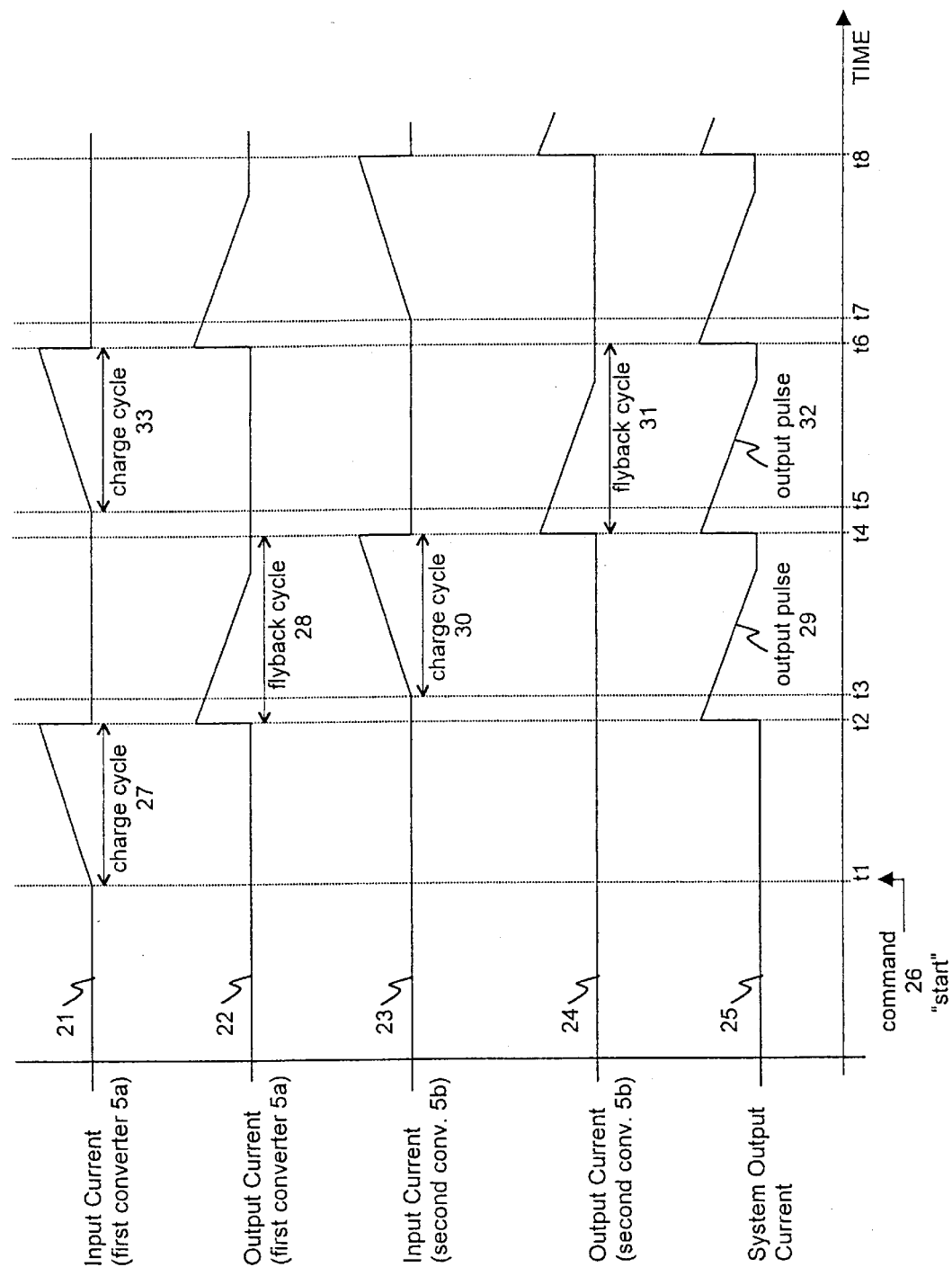
FIG. 2 is a timing diagram showing waveforms of the invention in its simplest Dual-Interleaved form.

FIG. 2 shows the timing diagram illustrating operation of the system shown in FIG. 1 comprised of two converter stages. Five waveforms are shown on a common time axis. Waveforms 21 and 22 show the input current and output current respectively for the first flyback circuit 5a shown in FIG. 1. Waveforms 23 and 24 show the input current and output current respectively for the second flyback circuit 5b shown in FIG. 1. The final waveform 25 shows the combined output current that will be filtered and delivered to the load.

The command 26 to begin conversion occurs at time t1. This initiates the charge cycle 27 of converter 5a shown in waveform 21. After sufficient energy has been stored in transformer 7a (reference FIG. 1) the input current to the first converter is switched off and current drops to zero ending the charging cycle at time t2. The Flyback cycle 28 begins immediately and its energy contribution is shown as output pulse 29 on the system output current waveform 25.

The triangular shapes of these waveforms are approximate, and are meant to convey the timing relationship between the channels rather than an exact representation of the waveshapes. Details concerning the method by which the input-current peak is controlled are not the subject of this invention and will not be described. Generally, this class of flyback converters are called "current-mode" converters because the stored energy for each cycle is controlled by allowing the input current to ramp up to a predetermined threshold thus controlling the stored energy according to the formula: energy=½×L(inductance)×I²(current squared).

Referring back to FIG. 1, the control logic 4 now diverts input power to the second converter 5b. Generally, to insure a smooth transition of power, the logic inserts a small amount of deadtime during which neither converter is powered. Referring again to FIG. 2, this deadtime occurs between times t2 and t3. While the first converter is still delivering its output current, the logic begins the charge cycle 30 of the second converter at time t3. The second converter reaches its stored energy threshold at time t4 and is switched off to begin its flyback cycle 31. The contribution of the second converter's energy to the load is shown as output pulse 32 on the system output current waveform 25.

After another insertion of deadtime between times t3 and t4, the first converter begins another charge cycle 33 at time t5. This charge cycle substantially overlaps the flyback cycle 31 of the second converter. These alternating cycles of the two converters continue until some later time when input command 26 stops the process, or when an internally generated stop signal occurs (e.g. upon reaching full charge at the output).

As can be seen in the system output current waveform 25, the output pulses occur twice as often as they would with a single converter. Thus the output frequency is doubled, and the filtering to smooth this ripple can be minimized.

Another advantage of this invention is now made apparent by evaluating the failure modes of the system. Referring back to FIG. 1, the components most likely to fail are those with the maximum electrical and thermal stress. The power electronic switches 6 are generally the weakest link. In a system made according to this invention, the failure of one of these switches (6a or 6b) does not cause complete system failure. In the event that switch 6a were to fail, the independent converter 5b will continue to operate. Since semiconductor switches commonly fail as a short circuit, a fuse (16a) is included in series with the switch and the primary of the transformer. This fuse disconnects the failed circuit from the input power 1 so that the second converter continues to receive power. Although the output power is cut in half, the load still receives power. This type of failure is known as a "soft failure" as opposed to a "hard failure" which would completely disable the system. In certain space or aviation missions this "soft failure" mode may allow the mission to continue.

Figure 3:
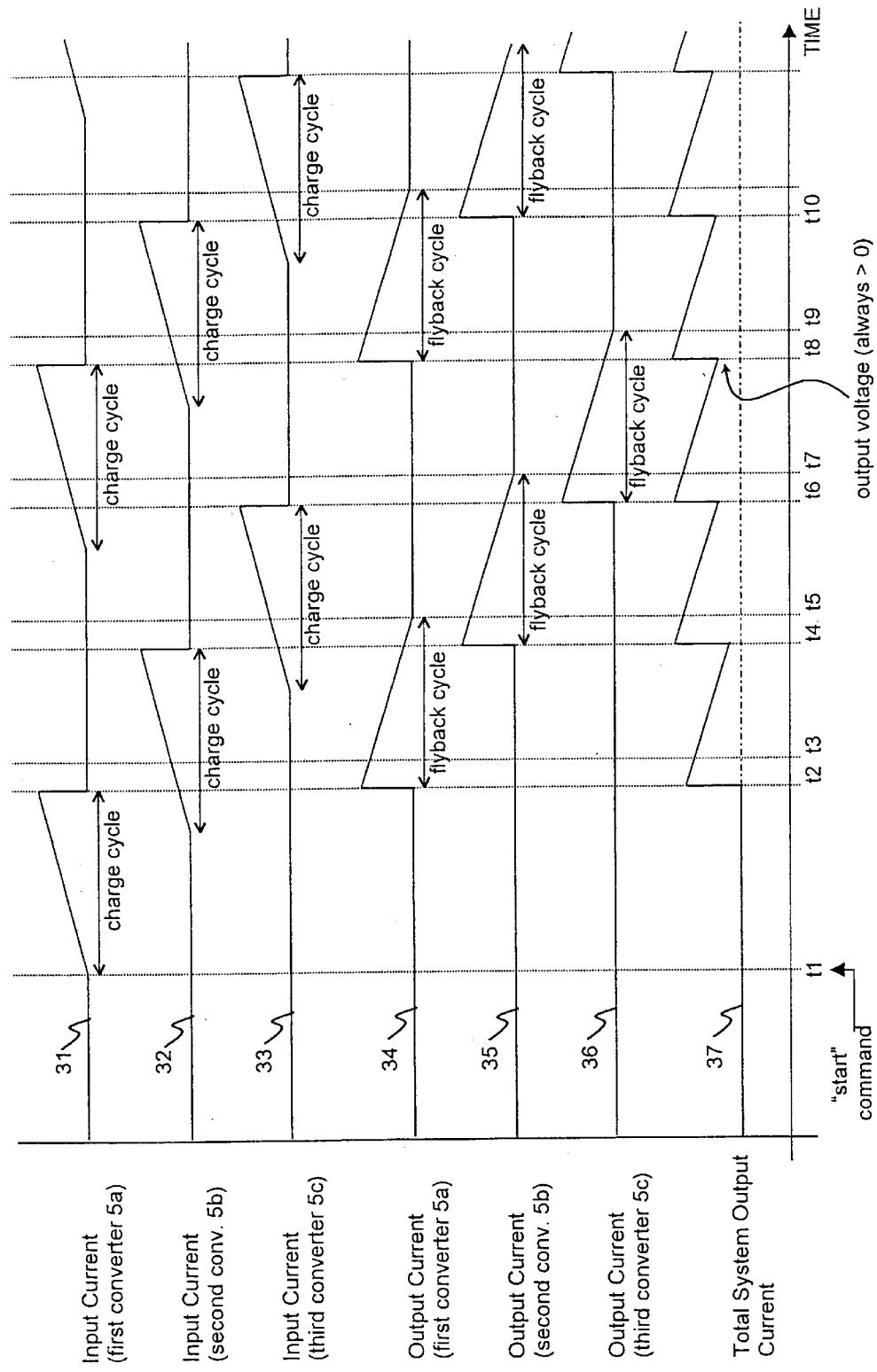
FIG. 3 is a timing diagram showing waveforms of the invention in its Triple-Interleaved form.
Figure 4:
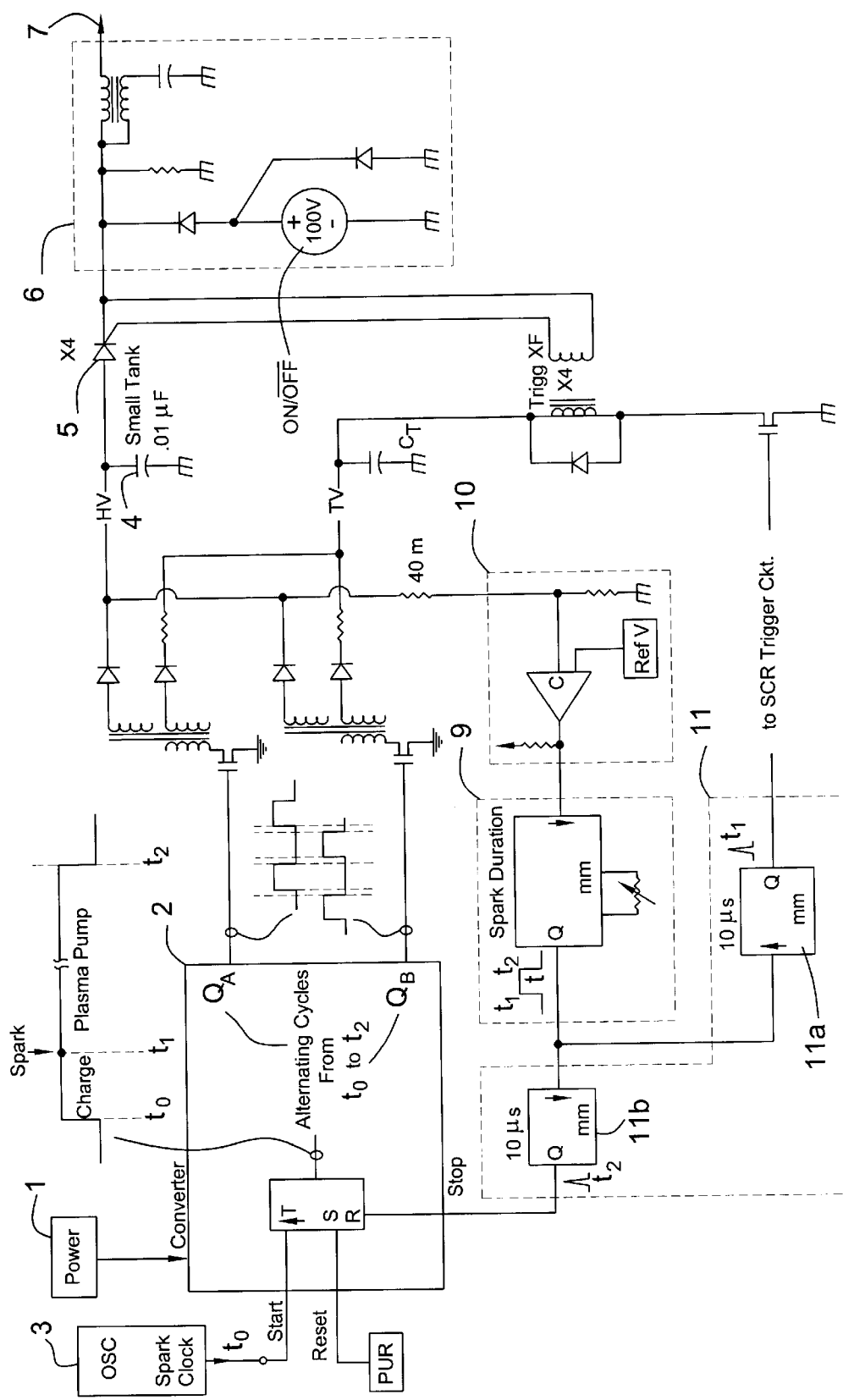
FIG. 4 is a circuit diagram illustrating an embodiment of the invention.

If an additional stage is added to FIG. 1 in parallel with circuits 5a and 5b, then the invention becomes a triple-interleaved converter. FIG. 3 is a timing diagram similar to FIG. 2, which shows the operation of a triple-interleaved embodiment. Turning now to FIG. 3, the third flyback circuit is designated as 5c. Three input current waveforms 31, 32, 33 are shown one for each of the converters (5a, 5b, 5c). The charging cycles are offset. Each circuit operates 120° out of phase with its neighbors. At this phase angle, the charging cycles partially overlap—for example, between times t1 and t2, there is a period when input current 32 begins to rise while input current 31 is still at a high level. Similar overlaps occur for currents 32 and 33 between t3 and t4, for currents 33 and 31 between t5 and t6, and so on.

As was discussed previously with regard to FIG. 2, the flyback cycle for any converter begins at the instant the charge cycle terminates. In FIG. 3 the flyback cycles occur in the output current waveforms 34, 35, 36 respectively for converters 5a, 5b, 5c. Notice that these waveforms also overlap in much the same way as the input current waveforms. The total system output current waveform 37 is a summation of the individual output currents 34, 35 and 36. As is generally the case for multiphase power systems, the overlapping phases produce a waveshape (37) that never falls to zero. Examining the waveform 37 at time t8, it can be seen that the output current just before t8 is due to the contribution of output converter 5c (36); although decreasing, it has not reached zero. At time t8, the flyback cycle of converter 5a begins (34) and the output current rises instantly to the sum of the currents shown by 34 and 36.

The output current waveform 37 has a frequency ripple which is triple the frequency of any of the converters acting alone. Similarly, the sum of the input currents has a triple frequency. At both input and output, this invention reduces the need for heavy and bulky filter components. Finally, the triple-interleaved embodiment also has a soft-failure-mode. If one of the converters fails, the output power only drops by a third (33%). Two-thirds of the output is still available to continue the mission.

The timing diagrams of FIG. 2 and FIG. 3 show converter operation in a mode that is called the discontinuous mode. In this mode a complete transfer of stored energy to the load occurs for each flyback cycle. The start of the successive charge cycle occurs after the end of the flyback cycle when the secondary current has dropped to zero. Flyback converters can also be operated in the continuous mode, where the successive charge cycle begins before the secondary has completely delivered its energy during the flyback cycle. This causes the end of a flyback cycle to overlap the beginning of the next charge cycle. Even though there is overlap of the charge and flyback cycles of an individual converter, the charge cycles of the separate flyback circuits (5a and 5b in FIG. 1) can still be interleaved so that the charge cycles occur alternately. Thus, operation in the continuous mode is within the spirit and scope of this invention.

It should be apparent to those skilled in the art of power converters that this embodiment can be extrapolated to many interleaved phases. For example, 6 phases could be employed with each converter operating 60° out of phase with its neighbors. All of the previous advantages will be realized in a system that has six times the ripple frequency. The magnitude of the ripple is also reduced as the number of phases increases.

Theoretically, there is no limit to how many phases can be interleaved. The dual-interleaved embodiment offers a large improvement with minimal addition of components. Referring back to FIG. 1, each flyback circuit 5a and 5b is shown with some driver circuit 13a and 13b for turning-on or turning-off the electronic switch 6a or 6b. The flyback circuits also have energy (current) sensors (14a, 14b) to detect the desired energy level in the primary winding (8a or 8b) to turn-off the switches (6a or 6b). Sensing the energy level is usually done by sensing current in the primary windings using a current transformer or current shunt, but may also be inferred from the charge time or by a variety of other means. In the dual interleaved case, since converter 5a and converter 5b never have their charge cycles at the same time, the same driver circuit and current sensor can be beneficially shared between the two flyback circuits. In this simplified dual-interleaved embodiment, the driver circuits (13a, 13b) may be combined into the control logic 4 and a single current sensor can provide feedback from both primary circuits. This only requires that the driver have complementary outputs (one ON while the other is OFF) and that whichever primary current is flowing must be detected by the shared current sensing circuit. Integrated circuits exist with the proper complementary outputs to perform this function, such as the UC1846 family of PWM controllers. In the triple (and higher) interleaved embodiments, the converter logic may have to be replicated for each flyback circuit, although schemes that allow sharing of portions of the circuit such as the current sensing logic are still within the spirit and scope of this invention.

Turning to the specific embodiment illustrated in FIG. 2, an energy converter 2 receives input power from an external source 1, typically a battery or generator producing regulated power. The energy converter 2 is preferably an interleaved flyback converter as described in FIGS. 1 through 3 above. Upon receipt of a start signal that originates at spark clock 3 (e.g., any source, depending upon the application, but a simple oscillator is an example), the converter 2 begins transforming the input power into a voltage appropriate for ionizing a gas or mixture. This is generally a high voltage (e.g., on the order of one or more kilovolts), and may be accumulated by a small capacitor 4 (e.g., a 0.01 $\mu$F capacitor).

Capacitor 4 is also connected to a switch 5 that has a high impedance (off) state that temporarily prevents delivery (leakage) of energy to an output network 6 and via an external connection 7 which is typically an ignition lead, to a spark generating device such as a conventional semiconductor plug (not shown).

After power is applied to the system, in the illustrated embodiment, the start pulses from spark clock 3 are generated periodically. However, those skilled in the art of ignition systems will appreciate that these pulses can instead originate at an external device such as an electronic engine control or system computer, and may be non-periodic. In either case, the pulses serve to begin the conversion cycle that pumps energy into capacitor 4 and eventually into the plasma arc formed at the air gap of the spark-generating device—e.g., an igniter plug for a turbine engine.

The switch 5 is preferably a solid-state switch such as a silicon-controlled rectifier. The operation of such a switch is described in detail in U.S. Pat. No. 5,245,252, which is hereby incorporated by reference in its entirety. Those skilled in the art of ignition systems will appreciate, however, that other types of switches such as triggered-spark-gaps could be employed instead of the solid state switch without departing from the spirit and scope of the invention. In any event, in the preferred embodiment four SCRs connected in series comprise switch 5.

The solid-state switch 5 is activated, (i.e., caused to switch to its low impedance (on) state), at the appropriate time by a trigger circuit 9, which as illustrated is implemented as a simple one-shot, flip-flop circuit of conventional design. In the preferred embodiment of FIG. 2, the trigger circuit is responsive to a sensor circuit 10 that monitors the voltage on capacitor 4. The capacitor 4 is not equivalent to the tank capacitor in a conventional capacitive discharge (CD) ignition system, which stores large amounts of energy. Instead, the capacitor 4 has a small capacitance that allows the accumulation of a sufficient voltage to ionize the air gap of the igniter plug but stores only a small amount of energy.

Sensor circuit 10, comprised of a operational amplifier and a reference voltage source as illustrated in FIG. 2, triggers the solid-state switch 5 when a voltage sufficiently high to ensure ionization of the air gap of the sparking device has been accumulated by capacitor 4. As those skilled in the art of ignition systems will appreciate, the precise value of the voltage depends on the characteristics of the sparking device. Sensor circuit 10 simultaneously triggers a timer circuit 11 that determines the length of time after the trigger event (which causes ionization) during which the converter circuitry 2 continues to run, thus pumping energy into the plasma arc. In the illustrated embodiment of FIG. 2, the timing circuit 11 comprises two conventional edge-triggered flip-flop circuits 11a and 11b, where the flip flop 11a outputs a pulse on the rising edge of the output from the trigger circuit 9 and the flip-flop 11b outputs a pulse on the falling edge of the output from the trigger circuit 9.

This operating cycle of the ignition device illustrated in FIG. 2 is contrary to the operating cycle of a conventional CD ignition. In those conventional circuits, the converter typically ceases to run for a period of time prior to or immediately after the trigger event. Thus, all of the energy in a conventional CD ignition must be stored prior to the trigger event. In contrast, in the embodiment of the invention illustrated in FIG. 2 most of the energy delivered to the arc at the air gap of the igniter plug is generated by the converter after the trigger event has ionized the gap and a plasma has formed.

An output pulse is generated by timer 11 at the end of its preset time period. This pulse is applied to the stop input of converter 2 and terminates the pumping of energy by this converter, which quenches the arc. The operating cycle of converter 2 has two distinct phases. The first phase begins at time t0 when the spark clock initiates a cycle, and ends at time t1 when sensor 10 and trigger circuit 9 causes the trigger event. The second phase begins at t1 (the trigger event) and ends at t2 when timer 11 completes its preset interval. Unlike previous ignition systems that generally have a fixed energy spark, the energy delivered to the arc of the instant invention can be varied simply by extending or reducing the preset value of timer 11. Changing the preset modifies the time interval (t2–t1) during which the arc receives energy from converter 2 which heats and sustains the plasma. The longer this interval, the more total energy is transferred to the arc.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. Therefore, the invention as described herein contemplates all such embodiments as may come within the scope of the following claims and equivalents thereof.

We claim:

1. A method for cyclically charging an energy storage capacitor of an ignition system to a high energy level, the method comprising the steps of:

charging the energy storage capacitor by repeatedly (1) allowing current from a common source to flow through primary windings of fly-back transformers; (2) interrupting the flow of current through the primary windings; (3) transferring energy stored in the primary windings to secondary windings of the fly-back transformers; and (4) transferring the energy from the secondary windings to the energy storage capacitor;

interrupting the charging of the energy storage capacitor by the fly-back transformers when the energy storage capacitor is charged to a predetermined level of energy; and discharging the energy stored in the energy storage capacitor.

2. The method of claim 1 wherein the interruption of the flow of current through one of the primary windings is out of phase with respect to the interruption of the flow of current through another one of the primary windings.

3. The method of claim 1 wherein the failure of one of the flyback converters does not cause the failure all of the other flyback converters and the system still operates at a reduced power level.

4. A method for cyclically charging and discharging an energy storage capacitor of a pulse plasma thruster system, the method comprising the steps of:

charging the energy storage capacitor by repeatedly (1) allowing current from a common source to flow through primary windings of fly-back transformers; (2) interrupting the flow of current through the primary windings; (3) transferring energy stored in the primary windings to secondary windings of the fly-back transformers; and (4) transferring the energy from the secondary windings to the energy storage capacitor;

interrupting the charging of the energy storage capacitor by the fly-back transformers when the energy storage capacitor is charged to a predetermined level of energy; and discharging the energy stored in the energy storage capacitor.

5. The method of claim 4 wherein the interruption of the flow of current through one of the primary windings is out of phase with respect to the interruption of the flow of current through another one of the primary windings.

6. The method of claim 4 wherein the failure of one of the flyback converters does not cause the failure all of the other flyback converters and the system still operates at a reduced power level.

7. A method for charging an energy storage capacitor of an ignition system to a fraction of total spark energy and thereafter supplying energy directly to the spark, the method comprising the steps of:

charging the energy storage capacitor by repeatedly (1) allowing current from a common source to flow through primary windings of fly-back transformers; (2) interrupting the flow of current through the primary windings; (3) transferring energy stored in the primary windings to secondary windings of the fly-back transformers; and (4) transferring the energy from the secondary windings to the energy storage capacitor;

discharging the energy stored in the energy storage capacitor after the energy storage capacitor has stored enough energy to ionize a spark generating device; and interrupting the charging of the energy storage capacitor by the fly-back transformers at a predetermined time after beginning the discharging of the energy storage capacitor.

8. The method of claim 7 herein the interruption of the flow of current through one of the primary windings is out of phase with respect to the interruption of the flow of current through another one of the primary windings.

9. The method of claim 7 wherein the failure of one of the flyback converters does not cause the failure all of the other flyback converters and the system still operates at a reduced power level.

\* \* \* \* \*